(No Model.)

H. W. LESTER.
BICYCLE.

No. 565,472. Patented Aug. 11, 1896.

Witnesses
Scott H. Smith.
E. J. Hyde.

Inventor
Howard W. Lester by
Harry P. Williams
atty.

UNITED STATES PATENT OFFICE.

HOWARD W. LESTER, OF EAST HARTFORD, CONNECTICUT, ASSIGNOR OF ONE-HALF TO FREDERICK C. ROCKWELL, OF HARTFORD, CONNECTICUT.

BICYCLE.

SPECIFICATION forming part of Letters Patent No. 565,472, dated August 11, 1896.

Application filed April 24, 1895. Serial No. 546,999. (No model.)

*To all whom it may concern:*

Be it known that I, HOWARD W. LESTER, a citizen of the United States, residing at East Hartford, in the county of Hartford and State of Connecticut, have invented certain new and useful Improvements in Bicycles, of which the following is a specification.

The invention relates to the class of chainless bicycles which are known as "gear-machines;" and the object of the invention is to provide a simple, cheap, and durable arrangement for such machines which can be quickly adjusted for varying the ratio between the revolutions of the pedal-crank and the driving-wheel, whereby the force transmitted to the driving-wheel can be changed for increasing the speed or for decreasing the power required to drive the machine.

Figure 1:
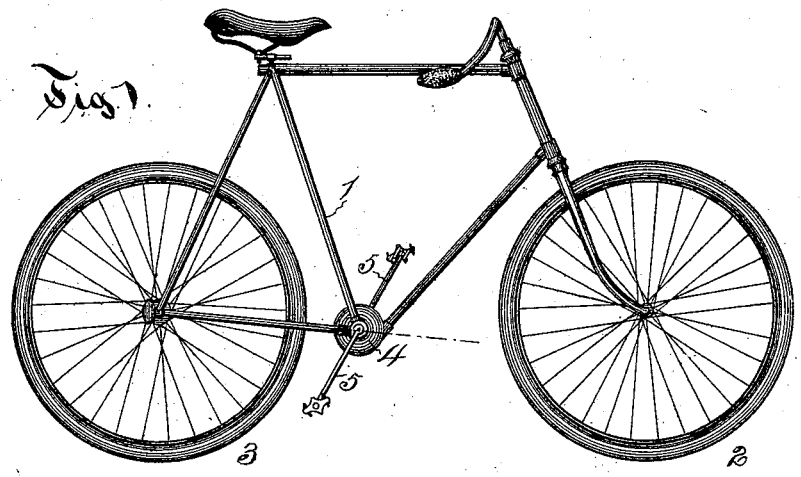
Figure 2:
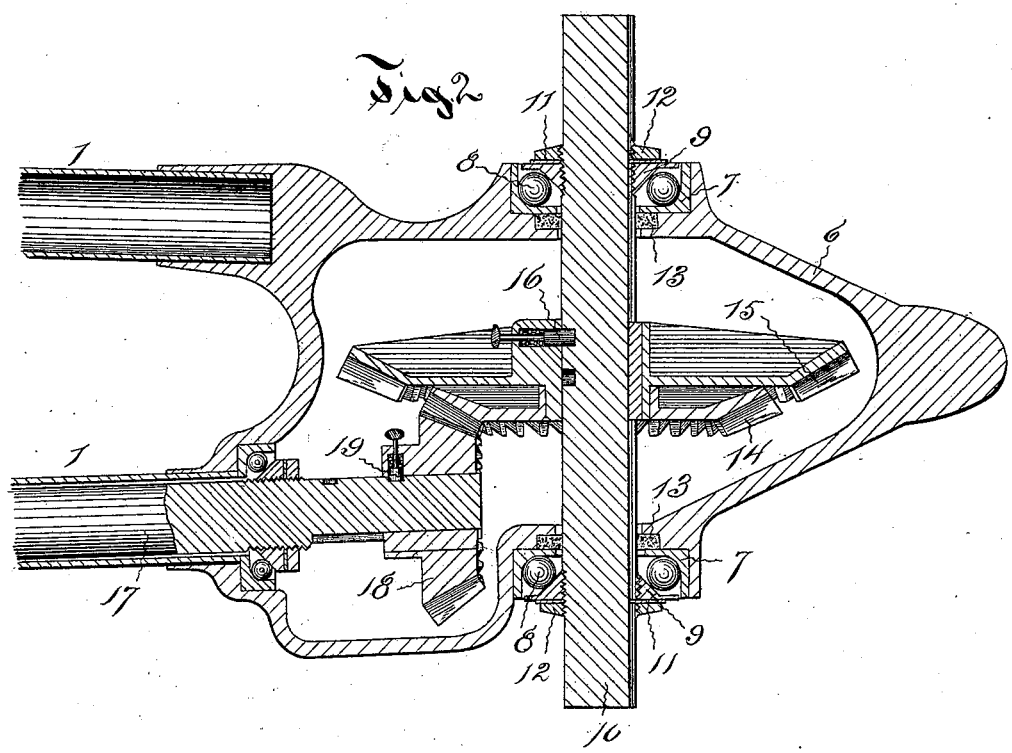

Referring to the accompanying drawings, Figure 1 is a side view of a machine provided with the invention, and Fig. 2 is a greatly-enlarged horizontal section through the driving mechanism at the crank-axle of such machine.

In the views, 1 indicates the tubular frame of a bicycle which is supported on any common style of steering-wheel 2 and driving-wheel 3. Between the wheels the frame bears a housing 4, which tightly incloses the intermeshing gears that transmit the power from the pedal-cranks 5 to the shaft that extends rearward and bears a gear in mesh with a gear connected with the driving-wheel. This housing may be made of any convenient light sheet metal and put on and finished to suit the taste. Within this housing the frame is formed of a yoke-shaped casting or forging 6, of suitable metal, to which the frame-tubes are secured in any common manner. Each side of this forging is provided with a perforation, and in sockets made adjacent to these perforations are placed ball-cups 7, bearing balls 8. Cones 9 are secured to the crank-axle 10 outside of the balls for forming the bearing-support of the axle. Outside of the cones upon the axle are placed washers 11, and outside of these are screwed the clamping-nuts 12. Inside of the ball-cups in suitable recesses are placed packings 13 for preventing the entrance of dirt or oil around the axle into the interior. Upon this crank-axle and keyed so as to rotate with it and yet have an adjustment longitudinally independent of it is a compound or double bevel-gear. One gear, 14, is cut smaller than the other gear, 15, and these gears may be formed from one piece of metal, or they may be formed separately and secured together. In the hub of this compound gear is a spring-plunger 16, and in the axle are registering notches or sockets to receive the end of this plunger. When the plunger is drawn outward, this compound gear is free to move longitudinally on the axle; but when the plunger engages one of the notches the compound gear is held against longitudinal movement and then rotates with the axle in that fixed position.

The shaft 17, which is supported by any suitable antifriction-bearings, extends rearward through one of the side tubes of the frame to a point where it bears a gear that meshes with a gear connected with the driving-wheel 3 for revolving that wheel, as is common in other machines of this class, and near the front end this power-transmitting shaft bears a bevel-gear 18. This bevel-gear is keyed to the shaft, so that while it will rotate with the shaft it may be moved independently longitudinally thereon. The hub of this gear bears a spring-plunger 19, that is adapted to engage locking-notches in the shaft. When the plunger engages a notch, the gear is held fast to the shaft; but when the plunger is pulled out the gear is free to move along the shaft.

When it is desired to run the machine slowly and have considerable power, as for climbing hills or traveling over heavy or rough roads, the spring-plunger holding the transmitting-shaft gear 18 is released and that gear set at the end of the shaft, and then the compound gear on the crank-axle when its plunger is released is set so that the smaller gear 14 meshes with the gear on the transmitting-shaft, as shown in Fig. 2. If it is desired to increase the ratio of rotation between the crank-axle and the transmitting-shaft, as for speeding over good ground, the plunger of the gear 18 of the transmitting-shaft is drawn out of the first notch and the gear moved longitudinally along the shaft until the plunger engages the second notch, so as to again hold the gear fast. Then the plunger holding the compound gear is pulled out so that the larger gear 15 can be pushed forward and made to engage with the teeth of the gear on the transmitting-shaft. When in this position, the plunger holding the compound gear encounters the second locking-notch in the crank-axle and holds the larger gear on the crank-axle in mesh with the smaller gear on the transmitting-shaft.

The gears are held firmly and securely to the respective crank-axle and transmitting-shaft, so that they will rotate without danger of breaking away and without liability of pulling or being forced apart, and by simply releasing the catches the gears are free to be quickly moved to vary the intermeshing of the gears for changing the power or speed of the machine. The construction is simple, cheap, positive, and can be quickly operated; but slight additional weight results, for the supplemental gear may be formed integral with the regular gear, and on this account also no additional space is required, so that the gears can be inclosed in a light, neat, and attractive housing.

I claim as my invention—

In combination with the driving mechanism of a bicycle, a pedal crank-axle, a compound bevel-gear having teeth in two different circles, keyed so as to rotate with but have adjustment longitudinally upon said crank-axle, an adjustable catch connecting the hub of the compound gear with the crank-axle for holding the compound gear against longitudinal movement upon the axle, a transmitting-shaft extending from the crank-axle to the driving-wheel, a bevel-gear having teeth adapted to mesh with the teeth of either of the compound gears and keyed so as to rotate with but have an adjustment longitudinally on said transmitting-shaft, and an adjustable catch connecting the hub of this gear with the transmitting-shaft for holding the gear against longitudinal movement upon said transmitting-shaft, substantially as specified.

HOWARD W. LESTER.

Witnesses:
H. R. WILLIAMS,
S. H. SMITH.